WIDE BAND MIXING SYSTEM

Filed Dec. 30, 1953 2 Sheets-Sheet 1

INVENTOR.
HORACE R. JOHNSON,
BY

HIS ATTORNEY.

SPECTRAL DISTRIBUTION - NO MODULATION

SPECTRAL DISTRIBUTION - $\theta_d = 1.84$

INVENTOR.
HORACE R. JOHNSON,
BY
Nicholas T Volk
HIS ATTORNEY.

United States Patent Office 2,899,596

Patented Aug. 11, 1959

2,899,596

WIDE BAND MIXING SYSTEM

Horace R. Johnson, Venice, Calif., assignor, by mesne assignments, to Hughes Aircraft Company, a corporation of Delaware Application December 30, 1953, Serial No. 401,302

1 Claim. (Cl. 315—3.6)

This invention relates to a wide-band mixing system, and more particularly, to apparatus including a wideband, high power, traveling-wave mixer tube capable of producing large phase deviations in a carrier signal in response to a comparatively low-voltage modulating signal.

Phase modulation is produced by varying the instantaneous phase of the carrier at a periodic rate having a maximum value proportional to the modulating frequency, and by an amount that is proportional to the amplitude of the modulating signal. The amplitude of the carrier signal preferably remains unaltered during this process.

It is well known that a conventional traveling-wave tube may be used to phase-modulate a carrier signal in accordance with a modulating signal by impressing the modulating signal between the cathode of the source of beam electrons and the helix of the tube. Ordinarily, either the cathode or the helix is maintained at a fixed potential such as ground, while the potential of the other is varied in accordance with the modulating signal. See, for example, Patent No. 2,603,772 entitled, "Modulation System," issued to Lester M. Field on July 15, 1952. For a traveling-wave tube having an electron stream of predetermined velocity, the phase deviation of the output signal depends only on the amplitude of the modulating signal, and all modulating frequencies of equal amplitude will possess equal values of phase deviation, independently of the modulating frequency. A change in the parameters of the tube for example, helix diameter, pitch, etc., which results in a decrease in electron stream velocity has the effect of increasing the phase deviation of the carrier per volt of modulating signal, but also decreases the maximum available power output from the tube.

A traveling-wave tube, when used to phase-modulate a carrier over a wide band of frequencies, has, however, certain disadvantages. For instance, both the cathode of the source of beam electrons and the helix possess considerable capacitance to ground. Inasmuch as the cathode normally has the lesser capacitance, it is preferred to vary its potential to effect the modulation. A wide band input circuit to the tube requires a resistor in shunt with the capacitance to ground of a magnitude equal to the reactance of the capacitance at the highest frequency at which it is desired to modulate the carrier. For a wide band of frequencies, the use of a fairly low value of resistance is required and results in a low value of input impedance. As set forth above, however, the phase deviation of the carrier signal is directly proportional to the amplitude of the modulating signal and varies inversely with the velocity of the electron stream. Thus, the lower the velocity of the electron stream, the greater the phase deviation throughout the length of the tube per volt of modulating signal, but the smaller the power output. Power output requirements place a limitation on the extent to which the velocity of the electron beam may be lowered but, at the same time, an increase in power output effected by an increase in stream velocity makes it necessary to provide a modulating signal of increased amplitude to effect a predetermined amount of phase deviation in the carrier signal.

As previously noted, for the case of a wide band traveling-wave mixer tube, however, the modulating signal must be generated across a comparatively low input impedance. This requires a considerable expenditure of modulating signal power and gains no increase in the power of the carrier signal.

These disadvantages have been overcome in the system of the present invention, a preferred embodiment of which comprises a traveling-wave mixer tube including an electron gun for generating an annular electron stream together with means for directing it along a predetermined path, a low voltage helix, a drift tube, and a high voltage helix disposed concentrically about the path in the direction of electron flow in the order named. In its operation, the voltage of the cathode of the electron gun is varied in accordance with the modulating signal, while the low voltage helix is simultaneously energized with the carrier signal. The low voltage helix serves to modulate the electron stream with the carrier signal, while the drift tube, also maintained at a low voltage, provides a substantial electrical distance for deviations in the phase of the carrier frequency to occur. The high voltage helix serves to amplify the power of the phase-modulated carrier signal. Suitable stop bands are used on the low and high voltage helices to prevent backward wave oscillations from occurring. These stop bands may, for example, be of the type disclosed in a copending application for patent Serial No. 401,303, entitled "Traveling-Wave Tube," filed on December 30, 1953 by Dean Watkins and H. R. Johnson, now Patent No. 2,809,321, issued October 8, 1957.

A drift tube is used to provide a longer electrical length for deviations in phase to take place due to changes in electron velocity than would be available with a helix. As generally known, a change in electron velocity produces a proportional change in the phase of a space-charge wave propagated by the electron stream. There is no change, however, in the phase of an electromagnetic wave propagated by a slow wave structure such as a helix. Thus, the resultant phase change for the growing wave, which is a composite space-charge and electromagnetic wave propagated by an electron stream flowing through a helix, is considerably less than the phase change of a space-charge wave in a drift tube. The resultant phase change that takes place in a helix is, in fact, approximately one-half the phase change in a drift tube. It is realized that there are structures which only partially attenuate the electromagnetic wave rather than eliminating it entirely as in the case of the drift tube, thereby producing phase changes intermediate between the helix and the drift tube. It is apparent that structures of this type also fall within the scope of the teachings of the present application for patent.

In addition to the above, it is also apparent that a solid electron stream may be used in lieu of the annular stream incorporated in the disclosed embodiment of the system of the present invention. The use of a solid electron stream, however, has certain disadvantages. As indicated above, it is desirable to reduce the velocity of the electron stream within the drift tube as much as possible in order to effect maximum phase deviation per volt of modulating signal. In the case of the solid electron stream, the current that may be directed through a drift tube is limited. That is, a saturation current is reached where the negative space charge of the electron stream reduces the potential in its center region to the extent that the entire stream is repelled. Also, since the saturation current is a function of a space-charge density in the electron stream, there is a limit to the extent to which the electron stream velocity may be reduced. When an annular electron stream is used, however, the potential of the drift tube tends to predominate throughout the region occupied by the entire electron stream so that the saturation current is much higher, thus enabling the electron stream velocity to be reduced much further, or the power output of the tube to be increased. A solid beam, however, has compensating advantages which may warrant its use in the tube of the present invention in certain instances, for example, in a tube having a solid stream, magnetic lens or electrostatic focusing is simpler than in the case of a tube having an annular stream. Further, a tube having a solid stream is more economical to construct, and also may not require stop bands for preventing backward wave oscillations.

Thus, it is evident that the present system is particularly adapted, for example, to frequency or phase-modulate a microwave carrier signal over a wide band of frequencies, to change the carrier frequency of a received signal to enable it to be re-transmitted in the same locality without danger of feedback, and to change or convert frequency in transmitter and receiver applications.

It is therefore an object of this invention to provide an improved apparatus to phase-modulate a microwave carrier signal over a wide band of frequencies.

Another object of this invention is to provide apparatus including a traveling-wave mixer tube capable of producing a high power phase-modulated output signal with comparatively low input modulating power.

Still another object of this invention is to provide apparatus including a traveling-wave mixer tube which incorporates a low voltage drift tube that requires a small modulating signal to produce substantial phase deviations in a carrier signal for a wide band of frequencies.

A further object of this invention is to provide apparatus including a traveling-wave mixer tube wherein an annular electron stream is directed concentrically through a drift tube at a low velocity to provide a substantial electrical distance for phase deviations to occur.

A still further object of this invention is to provide a system for shifting the frequency of a microwave carrier signal including a high power traveling-wave mixer tube that incorporates an annular electron stream directed through a low voltage helix to modulate the stream with a carrier signal, a drift tube to phase-modulate the carrier, and a high voltage helix to amplify the phase-modulated carrier, both the low and high voltage helices including stop bands to prevent backward wave oscillations.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only, and are not intended as a definition of the limits of the invention.

Figures 1, 2, 3:
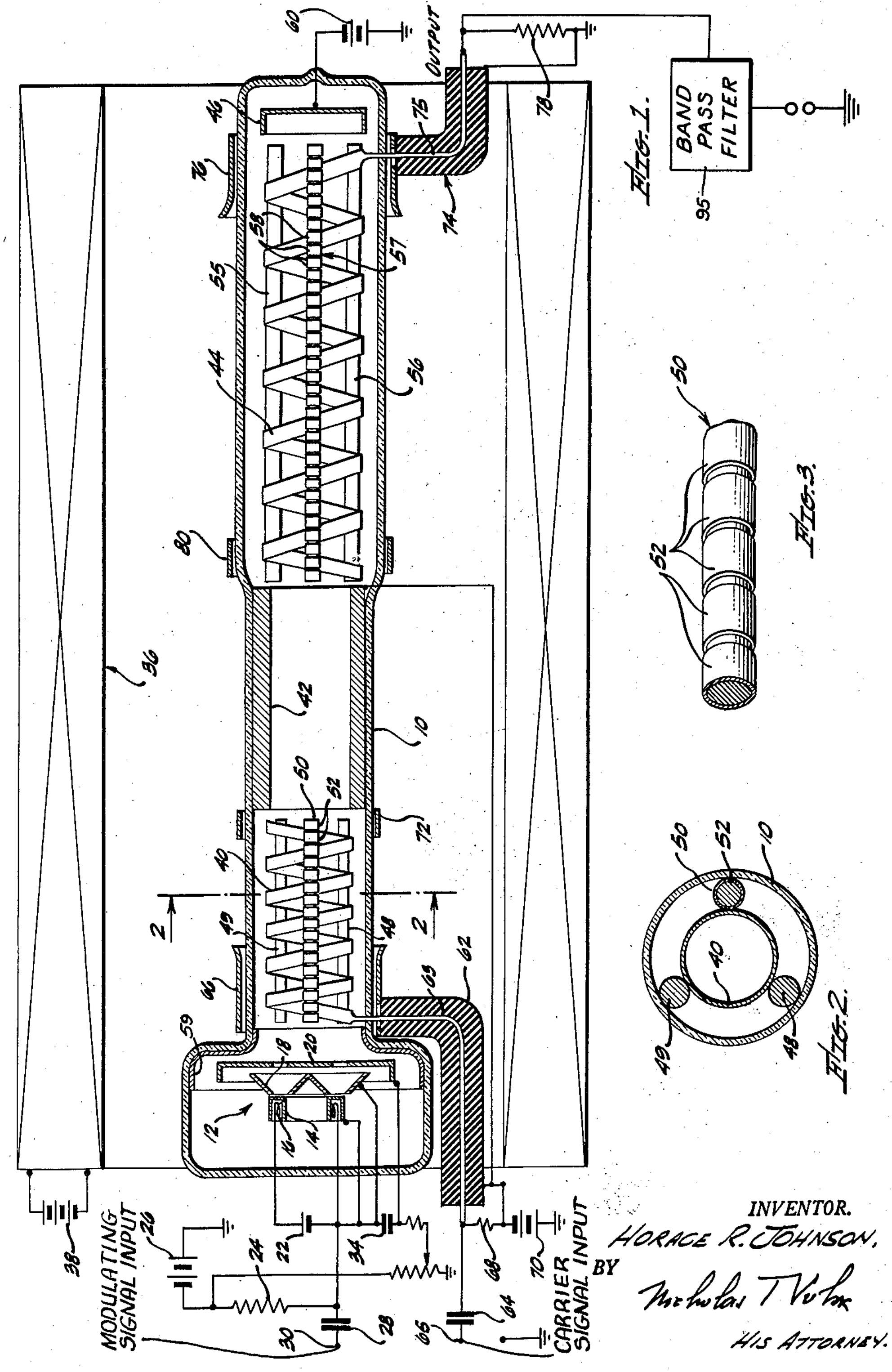
Fig. 1 is a diagrammatic sectional view of a preferred embodiment of the system of the present invention.
Fig. 2 is a view of section 2—2 of the tube of the system of Fig. 1.
Fig. 3 is an enlarged view of a portion of the apparatus providing the stop band for the tube of the system of Fig. 1.

Referring now to Fig. 1, there is shown a diagrammatic sectional view of the system of the present invention. An envelope 10, which provides the necessary evacuated chamber, consists of a long cylindrical structure with an enlarged portion at the left extremity as viewed in the drawing. Within this enlarged portion of envelope 10, there is disposed an electron gun 12 for producing an annular electron stream. Electron gun 12 comprises an annular cathode 14 with a heater 16, a focusing electrode 18, and an accelerating anode 20, the electrodes 18 and 20 being provided with conformal apertures to allow passage therethrough of the electron stream.

Cathode 14 is disposed in a plane normal to the longitudinal axis of envelope 10 and is maintained at a suitable temperature for effecting proper electron emission by heater 16. Heater 16 is connected across a source of potential, such as a battery 22, one terminal of which might be connected to cathode 14 as shown; on occasion this may not be desirable because of introduction of additional capacitance between cathode and ground. The electrode 18 consists of a conductive member having an inner and an outer surface of revolution, each disposed at an angle of approximately 67½° from the path of the electron stream which is directed along the longitudinal axis of envelope 10. Cathode 14 and focusing electrode 18 are preferably connected together and are maintained at a potential of the order of −1000 volts with respect to ground by means of a connection through a resistor 24 to the negative terminal of a battery 26, the positive terminal of which is connected to ground. A capacitor 28 is connected from a terminal 30 across resistor 24 to cathode 14 to provide an input for modulating the potential of cathode 14.

Accelerating anode 20 is disposed in a plane normal to the longitudinal axis of envelope 10 to the right of focusing electrode 18 as viewed in the drawing. Anode 20 is maintained at an adjustable quiescent potential of the order of from 0 to 1000 volts positive with respect to the potential of cathode 14 in order that the current of the electron stream may be varied without affecting the cathode-to-helix potentials. This is effected by means of a connection from anode 20 through a resistor 32 to a tap 33 of a potentiometer 35 which is connected across battery 26. In addition, the potential of anode 20 is preferably made to vary in the same manner as the potential of cathode 14 and focusing electrode 18 in order to avoid density-modulating the electron stream. This may be accomplished by coupling anode 20 to cathode 14 through a capacitor 34. The occasion may arise, however, whereby minimum capacitance from cathode 14 to ground is required because of the width of the band of modulating frequencies. In this event, the capacitance to ground may be reduced by decoupling focusing electrode 18 and anode 20 from cathode 14.

The electron stream produced by electron gun 12 is constrained and directed along a predetermined path parallel with the longitudinal axis of envelope 10 by means of a solenoid 36 which is symmetrically disposed about the longitudinal axis of envelope 10. An appropriate direct current is made to flow through solenoid 36 by means of a battery 38 connected across its input to produce a magnetic field that extends axially along the tube which may be of the order of 300 to 2000 gauss.

Positioned concentrically about the path of the electron stream are a low voltage helix 40, a drift tube 42, and a high voltage helix 44. A collector electrode 46 is disposed at the right extremity of envelope 10 so as to intercept and collect the electron stream as it emanates from the high voltage helix 44.

Helices 40 and 44 have a circumference that is of the order of 0.15 to 1.0 free space wavelength of the carrier frequency, or greater if bifilar or multifilar helices are employed. In the event that a solid stream is used rather than the annular electron stream, the circumference of the helices 40, 44 may be as small as 0.1 wavelength or less. In general, the outer diameter of the electron stream should be at least 0.8 the inner diameter of the helix in order that a high impedance be presented to the electron stream. A material such as tungsten or molybdenum is suitable for making the helices, the main prerequisite being that they retain their form, especially with respect to their pitch and diameter. Helix 40 is supported within envelope 10 by three dielectric rods 48, 49 and 50 disposed about helix 40 at equal intervals as shown in Fig. 2. Dielectric rod 50, in addtion to providing support for helix 40, also serves to provide a stop band to prevent backward wave oscillations. This may be done by making the dielectric rod 50 conductive in the transverse direction and non-conductive in the longitudinal direction. One manner in which this may be accomplished, for example, is by disposing a series of conductive bands 52 along its entire length as illustrated by the enlarged view of a portion of rod 50 in Fig. 3. The width of a single conductive band is less than the pitch of helix 40 to prevent erroneous modes of propagation in the axial direction. Helix 44 is similar to helix 40 except that it is designed to operate at a higher voltage and has a slightly larger diameter to minimize the interception of stream electrons and optimize its gain at the operating frequency rather than at some higher frequency. Interception of the stream electrons is increased because the change in potential, in proceeding from drift tube 42 to helix 44, has a lens effect which may tend to de-focus the electron stream. Helix 44 is supported in the same manner as helix 40 by means of dielectric rods 55, 56 and 57. Conductive bands 58 are disposed along the entire length of rod 57 to provide a stop band as was done for helix 40.

An equipotential region between electron gun 12 and helix 40 is provided by a conductive coating 59 disposed concentrically about the electron stream on the inner surface of envelope 10 and extending from the electron gun 12 to the beginning of ferrule 66. Conductive coating 59 may be provided, for example, by painting the envelope 10 with a colloidal solution of carbon such as "aquadag."

An input to helix 40 is provided by a section of coaxial cable 62. A center conductor 63 of coaxial cable 62 is connected, at one extremity, through envelope 10 directly to the first turn of helix 40, and at the other extremity, through a capacitor 64 to an input terminal 65. The outer conductor of cable 62 is connected to ferrule 66 disposed concentrically about the first turns of helix 40 on the outside of envelope 10. The extremity of ferrule 66 farthest from electron gun 12 is flared out in order to improve the impedance match between coaxial cable 62 and helix 40. The outer conductor of cable 62 and ferrule 66 are preferably maintained at the same potential as that of helix 40 to avoid disturbing the flow of stream electrons. Helix 40 is maintained at the comparatively low potential of the order of 200 volts positive relative to the cathode 14 of electron gun 12. This is accomplished by a connection directly from the center conductor 63 of cable 62 through a resistor 68 to the negative terminal of a battery 70, the positive terminal of which is connected to ground. The voltage provided by battery 70 should be of the order of 800 volts in order to maintain helix 40 at a potential that is 200 volts positive with respect to cathode 14. Also, in order to maintain the outer conductor of cable 62 and ferrule 66 at the same potential as the quiescent potential of helix 40, the negative terminal of battery 70 is connected directly to the outer conductor of cable 62.

A termination is provided at the extremity of helix 40 farthest from electron gun 12 for the electromagnetic wave propagated thereon by means of a resistive coating 72. Resistive coating 72 is disposed about the last few turns of helix 40 on the outside of envelope 10 as shown in the figure. This resistive coating may be provided in the same manner as was conductive coating 58.

Disposed concentrically about the path of the electron stream subsequent to helix 40 is the drift tube 42. Drift tube 42 is maintained at the same low potential relative to that of cathode 14 as was helix 40 in order to provide a substantial electrical length for phase changes to occur in the space charge wave propagated by the electron stream. This potential is maintained on drift tube 42 by a connection directly to the negative terminal of battery 70.

Helix 44 is disposed concentrically about the last portion of the path of the electron stream, as previously stated. An output is provided from helix 44 by means of a section of coaxial cable 74. A center conductor 75 of cable 74 is connected through envelope 10 directly to the last turn of helix 44 farthest from electron gun 12. Improved impedance matching between helix 44 and cable 74 is provided by a ferrule 76 disposed concentrically about the last few turns of helix 44 outside of envelope 10 and connected to the outer conductor of coaxial cable 74. The extremity of ferrule 76 nearest to electron gun 12 is flared out in the same manner as was ferrule 66. Helix 44 is maintained at ground potential by means of a connection thereto from center conductor 75 of cable 74 through a resistor 78. As before, ferrule 76 and the outer conductor of coaxial cable 74 are preferably maintained at the same potential as that of helix 44 by means of a connection directly to ground.

A termination at the extremity nearest electron gun 12 for reflected waves propagated by helix 44 is provided by resistive coating 80. This resistive coating is disposed about the first few turns of helix 44 on the outside of envelope 10, and may be provided in the same manner as was resistive coating 72.

As previously mentioned, collector electrode 46 is disposed at the right extremity of helix 44, as viewed in the drawing, so as to intercept the electron stream after it has passed therethrough. Collector electrode 46 is maintained at a potential that is of the order of −200 volts negative with respect to the potential of helix 44 in order to effect a maximum transfer of the kinetic energy of the stream electrons to the electromagnetic wave propagated on helix 44 prior to the dissipation of all the energy of the stream on the collector electrode 46. This voltage is applied to collector electrode 46 by means of a connection to the negative terminal of a battery 60, the positive terminal of which is connected to ground.

Before proceeding with the operation of the tube of the present invention, some characteristics of a phase-modulated carrier signal will be noted. For a modulating signal having an instantaneous amplitude, $$e_m = E_m \sin \omega_m t \quad (1)$$

wherein:

$E_m$= peak value of modulating voltage
$\omega_m$=angular frequency of the modulating signal
$t$=time The instantaneous phase, $\phi(t)$, of the carrier signal may be written as:

$$\phi(t) = (\omega_c t + k_p E_m \sin \omega_m t) \quad (2)$$

wherein:

$\omega_c$=angular frequency of the carrier signal;
$k_p$=a proportionality factor that determines the maximum variation in phase for a predetermined carrier signal strength; and
$k_p E_m \equiv \theta_d$, the maximum deviation in phase.

The instantaneous carrier signal, $e_c$, may then be written as:

$$E_c = E_c \sin \phi(t) = E_c \sin (\omega_c t + \theta_d \sin \omega_m t) \quad (3)$$

wherein $E_c$ is the peak value of carrier signal.

Figure 4:
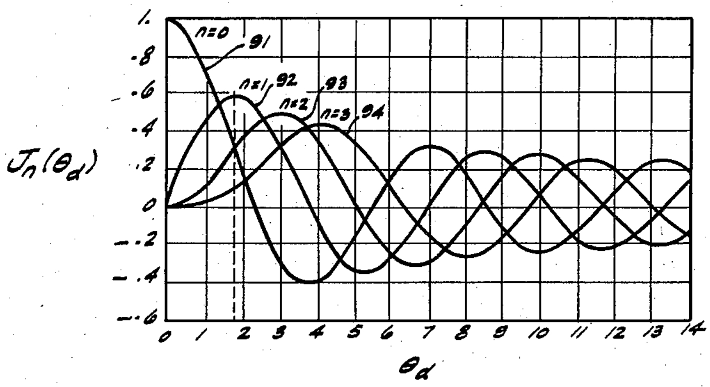
Fig. 4 is a plot of the magnitude of the spectrum components of a phase-modulated carrier, in the form of Bessel functions of the first kind, versus phase deviation.

Equation 3 above may be rewritten in a form to illustrate its spectral distribution as follows:

$$\begin{aligned} e_c = {} & J_0(\theta_d) E_c \sin \omega_c t \\ & + J_1(\theta_d) E_c [\sin (\omega_c + \omega_m) t - \sin(\omega_c - \omega_m) t] \\ & + J_2(\theta_d) E_c [\sin (\omega_c + 2\omega_m) t + \sin (\omega_c - 2\omega_m) t] \\ & + J_3(\theta_d) E_c [\sin (\omega_c + 3\omega_m) t - \sin (\omega_c - 3\omega_m) t] \\ & + \ldots \end{aligned} \quad (4)$$

wherein $J_n(\theta_d)$ are Bessel functions of the first kind of order $n=0, 1, 2, 3, \ldots$. From this last equation, it is noted that the magnitude of the various components of the modulated carrier signal is equal to the appropriate Bessel function times the initial amplitude of the carrier signal. For convenience, a graph illustrating the variation of Bessel functions of the first kind is shown in Fig. 4, wherein plots 91, 92, 93 and 94 are the values of Bessel functions of the first kind corresponding to orders 0, 1, 2 and 3, respectively, versus maximum phase deviation, $\theta_d$.

In numerous applications of the disclosed system of the present invention, it is desired to have maximum power in the first side band components of the phase-modulated carrier signal, the frequency of these components being $(\omega_c+\omega_m)$ and $(\omega_c-\omega_m)$. An examination of Fig. 4 reveals that this occurs when the maximum phase deviation, $\theta_d$, has a value of 1.84 radians.

At $\theta_d=1.84$ radians, the values of the Bessel functions of orders 0, 1, 2 and 3 are as follows:

$$J_0(1,84)=0.36$$
$$J_1(1.84)=0.58$$
$$J_2(1.84)=0.29$$
$$J_3(1.84)=0.08$$

Figure 5:
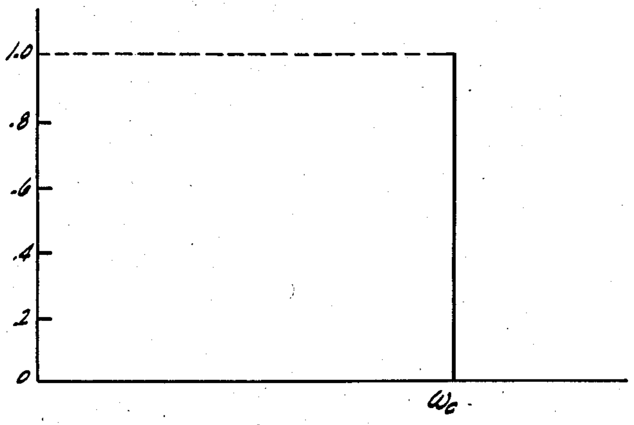
Figs. 5 and 6 are spectral distribution graphs of a carrier and of a phase-modulated carrier, respectively.
Figure 6:
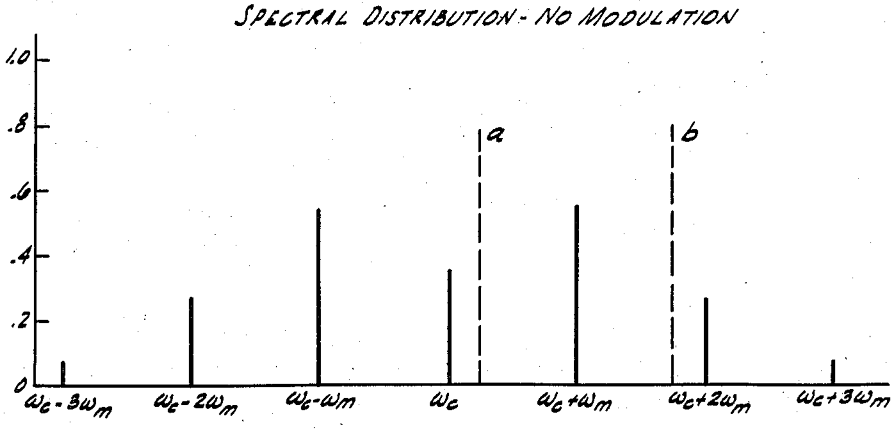

It is evident from Equation 4 that these values of the Bessel functions determine the character of the spectral distribution of a phase-modulated carrier signal having a maximum phase deviation of 1.84 radians. A plot of the spectra for an unmodulated carrier signal of frequency $\omega_c$ and the spectra for this same carrier signal after it has been phase-modulated 1.84 radians with a modulating signal of frequency $\omega_m$ are illustrated in Figs. 5 and 6, respectively. In Fig. 5, it is seen that there is just the single carrier component of 100 percent amplitude. In Fig 6, after this carrier signal has been phase-modulated 1.84 radians, it is seen that the amplitude of the carrier component has decreased to 36 percent of its initial value while the first, second and third side band components have amplitudes of 58 percent, 29 percent and 8 percent of the initial amplitude of the carrier signal, respectively. In the latter spectra, the power in the carrier component has been reduced to 13 percent of its initial value, while 33.6 percent, 8.4 percent and 0.6 percent of the initial power of the carrier signal reside in each of the first, second and third side band components, respectively.

In the event that it is desired to employ the disclosed system as a device for shifting the frequency of a received signal so that it may be retransmitted in the immediate vicinity without danger of feedback, it is only necessary to phase-modulate the received signal with a modulating signal of a frequency equal to the frequency shift desired. The signal to be retransmitted is then obtained by separating one of the first side band components from the phase-modulated signal by means of a band-pass filter 95. Referring to Fig. 6, for example, only the band from *a* to *b* of the spectra of the phase-modulated received signal would be employed as the output signal. There is no restriction on the manner in which the received signal is modulated except that the bandwidth required be less than the band from *a* to *b* of Fig. 6, and that this band does not include either the carrier frequency $\omega_c$, or the second side band component, $(\omega_c+2\omega_m)$. Thus it is apparent that, in order to shift the frequency of the carrier with reasonable efficiency, it is desirable to have maximum power in the first side band components of the phase-modulated carrier signal. As previously explained, this is accomplished by effecting a maximum phase deviation in the carrier signal of 1.84 radians. In order to produce a phase deviation of this magnitude with a conventional traveling-wave tube, a modulating signal of considerable amplitude and power is generally required.

The system of the present invention, however, can produce phase deviations of the above magnitude with a modulating signal of considerably less amplitude and power. In its operation, the carrier signal to be phase-modulated is applied to terminal 65 where it is impressed on helix 40 through capacitor 64 and the section of coaxial cable 62. The direct-current potential impressed on helix 40 is applied through resistor 68 so as not to provide a low impedance path to ground for this signal. The comparatively large diameter of helix 40 enables an impedance match to be obtained directly between the coaxial cable and the helix in the manner shown.

The carrier signal is then propabated by helix 40 along the path of the electron stream generated by electron gun 12 until it is terminated by resistive coating 72 disposed at the extremity of helix 40 farthest from electron gun 12. The carrier signal is propagated as an electromagnetic wave along the electron stream by the helix 40 at an appropriate velocity to effect constructive interaction with the electron stream. In this manner, energy is transferred from the electron stream to the electromagnetic wave which, in turn, modulates the stream. The average velocity of the stream during this process is, of course, determined by the potential difference between the helix and the cathode 14 of electron gun 12.

At the extremity of helix 40 farthest from electron gun 12, the electromagnetic carrier wave propagated by helix 40 is terminated by resistive coating 72, leaving only the modulated electron stream to enter into drift tube 42. As previously mentioned, the potential of drift tube 42 is maintained at a comparatively low voltage relative to that of cathode 14. In order to phase-modulate the carrier signal, it is necessary to vary the velocity of the electron stream in passing through drift tube 42 in accordance with a modulating signal. In the described embodiment, this is accomplished by varying the potential of cathode 14 with the modulating signal. The modulating signal is impressed on terminal 30 through capacitor 28 across resistor 24 to the cathode 14. The magnitude of the resistance of resistor 24 is equal to the reactance of the stray capacitance of cathode 24 to ground at the highest frequency at which it is desired to modulate. Hence, the wider the band over which it is desired to modulate the carrier, the smaller the resistance of resistor 24 required. It is apparent that the band of modulating frequencies may be raised in frequency by connecting an inductor in shunt with resistor 24. The focusing electrode 18 has been connected directly to cathode 14 to avoid de-focusing of the electron stream during modulation; in some cases this connection could be omitted and the focusing electrode grounded with negligible de-focusing. Also, the potential of accelerating electrode 20 is coupled to cathode 14 by means of capacitor 24 so that its potential varies in the same manner as that of cathode 14 to avoid density-modulating the electron stream; this connection can also frequently be omitted and the capacitor connected from accelerating electrode to ground with negligible density modulation.

Thus, as the electron stream progresses through helix 40 and drift tube 42, its average velocity is varied by the modulating signal impressed on cathode 14. As the electron stream passes through helix 40, it is modulated with the carrier signal to produce a space charge wave propagated by the stream. The velocity at which this space charge wave is propagated varies in accordance with the modulating signal. This variation in velocity over the electrical length of drift tube 42 constitutes phase deviations from the carrier frequency. Inasmuch as the velocity of the electron stream is only the equivalent of 20 to 200 volts through helix 40 and drift tube 42, the electrical length of this path is sufficiently long so that only a comparatively low value of modulating signal is required to cause the desired peak deviation in phase, which is of the order of 1.84 radians. Because of the annular electron stream used in the described tube, the potential of helix 40 and drift tube 42 predominates throughout the entire region occupied by the electron stream to prevent the space charge constituting the stream from slowing it down, thus enabling a low velocity stream to be used.

When an annular electron stream is used in conjunction with a helix, however, there is a tendency for backward wave oscillations to occur. These backward wave oscillations are prevented, as previously mentioned, by the use of stop bands which may constitute a series of discontinuities disposed at intervals of one-half wavelength or multiple thereof for the frequency it is desired to stop. Each successive discontinuity reflects a portion of the propagated energy back in such a manner as to cancel a portion of the wave propagated in a forward direction. Backward wave oscillations occur at frequencies corresponding to wavelengths approximately equal to the circumference and twice the circumference of the helix. Hence, the stop band in the disclosed tube may be provided by the transversely conducting rod, previously described, disposed lengthwise along the helix.

From the above, it is apparent that a phase-modulated space charge wave propagated by the electron stream emanates from the drift tube 42 and enters the helix 44. The higher potential of the region within the helix 44 increases the velocity of the stream electrons. In order to effect constructive interaction between the electron stream and an electromagnetic wave of the carrier frequency, it is necessary that helix 44 have a correspondingly greater pitch than the pitch of helix 40. The density variations of the electron stream propagating the space charge wave, upon traversing the helix 44, first induce a phase-modulated electromagnetic carrier wave on the helix 44, and secondly constructively interact with this carrier wave to increase its amplitude.

At the extremity of helix 44 farthest from electron gun 12, the amplified electromagnetic carrier wave is directed through the section of coaxial cable 74 to appear at the output terminal of the tube while the electron stream is intercepted by the collector electrode 46. The potential of collector electrode 46 is slightly lower than that of the helix 44 to cause a maximum amount of kinetic energy of the stream to be transformed to the electromagnetic carrier wave energy. In the event that any portion of the electromagnetic energy propagated on helix 44 is reflected at its connection to the center conductor 75 of cable 74, the reflected portion is propagated back along the helix and terminated by the resistive coating 80. The stop band for preventing backward wave oscillations from commencing on helix 44, provided by the dielectric rod 57 with the conductive bands 58, functions in the same manner as the stop band for helix 40.

What is claimed as new is:

A wide-band mixing system comprising a traveling-wave device including means including a cathode for producing a tubular electron stream; means for directing said electron stream along a predetermined path having first, second, and third portions; means including a first helix disposed concentrically about and contiguous to said path along said first portion for varying the flow of current constituting said electron stream in accordance with a carrier signal thereby producing a corresponding space charge wave propagated by said electron stream; means including a conductive tubular element disposed concentrically about and contiguous to said path along the second portion thereof for providing a drift region for said electron stream; means connected to said cathode and having a low magnitude of electrical capacitance with respect to the other elements of said system for varying the velocity as it leaves the cathode of said electron stream within said drift region about a first predetermined low velocity in accordance with a modulating signal whereby the velocity of said stream along said second portion of said path varies about a first predetermined velocity in accordance with said modulating signal thereby periodically changing the time required for said space charge wave to traverse said drift region; means including a second helix disposed concentrically about and contiguous to said path along the third portion thereof for accelerating said electron stream to a second predetermined velocity that is substantially greater than said first predetermined low velocity and for increasing the magnitude of the space charge wave which corresponds to the carrier signal phase-modulated at a frequency equal to that of the modulating signal, the circumference of said first and second helices being greater than 0.15 free space wavelength at the frequency of said carrier signal; first and second elongated dielectric members respectively disposed contiguously along each of said helices; and a plurality of patches of conductive material disposed in insulative relationship with each other on said elongated dielectric members to partially reflect waves propagated along the turns of said helices, thereby to prevent backward-wave oscillations from commencing.

References Cited in the file of this patent

UNITED STATES PATENTS

| | | |
|---|---|---|
| Re. 23,647 | Lindenblad | Apr. 21, 1953 |
| 2,584,308 | Tiley | Feb. 5, 1952 |
| 2,603,772 | Field | July 15, 1952 |
| 2,632,130 | Hull | Mar. 17, 1953 |
| 2,636,948 | Pierce | Apr. 28, 1953 |
| 2,654,047 | Clavier | Sept. 29, 1953 |
| 2,657,305 | Knol et al. | Oct. 27, 1953 |
| 2,730,647 | Pierce | Jan. 10, 1956 |
| 2,753,481 | Ettenberg | July 3, 1956 |
| 2,760,161 | Cutler | Aug. 21, 1956 |
| 2,800,606 | Tien et al. | July 23, 1957 |
| 2,805,333 | Waters | Sept. 3, 1957 |
| 2,811,664 | Kazan | Oct. 29, 1957 |

UNITED STATES PATENT OFFICE

Certificate of Correction

Patent No. 2,899,596 — August 11, 1959

Horace R. Johnson

It is hereby certified that error appears in the printed specification of the above numbered patent requiring correction and that the said Letters Patent should read as corrected below.

Column 6, line 72, for that portion of the equation reading "$-\sin(\omega_c = \omega_m)t]$" read — $-\sin(\omega_c - \omega_m)t]$ —; column 7, line 22, for "$J_0(1,84) = 0.36$" read — $J_0(1.84) = 0.36$ —.

Signed and sealed this 16th day of February 1960.

[SEAL]

Attest:
KARL H. AXLINE,
*Attesting Officer.*

ROBERT C. WATSON,
*Commissioner of Patents.*